C. T. RIDGELY.
DEMOUNTABLE WHEEL FOR VEHICLES.
APPLICATION FILED DEC. 27, 1915.
1,186,833.
Patented June 13, 1916.
2 SHEETS—SHEET 1.
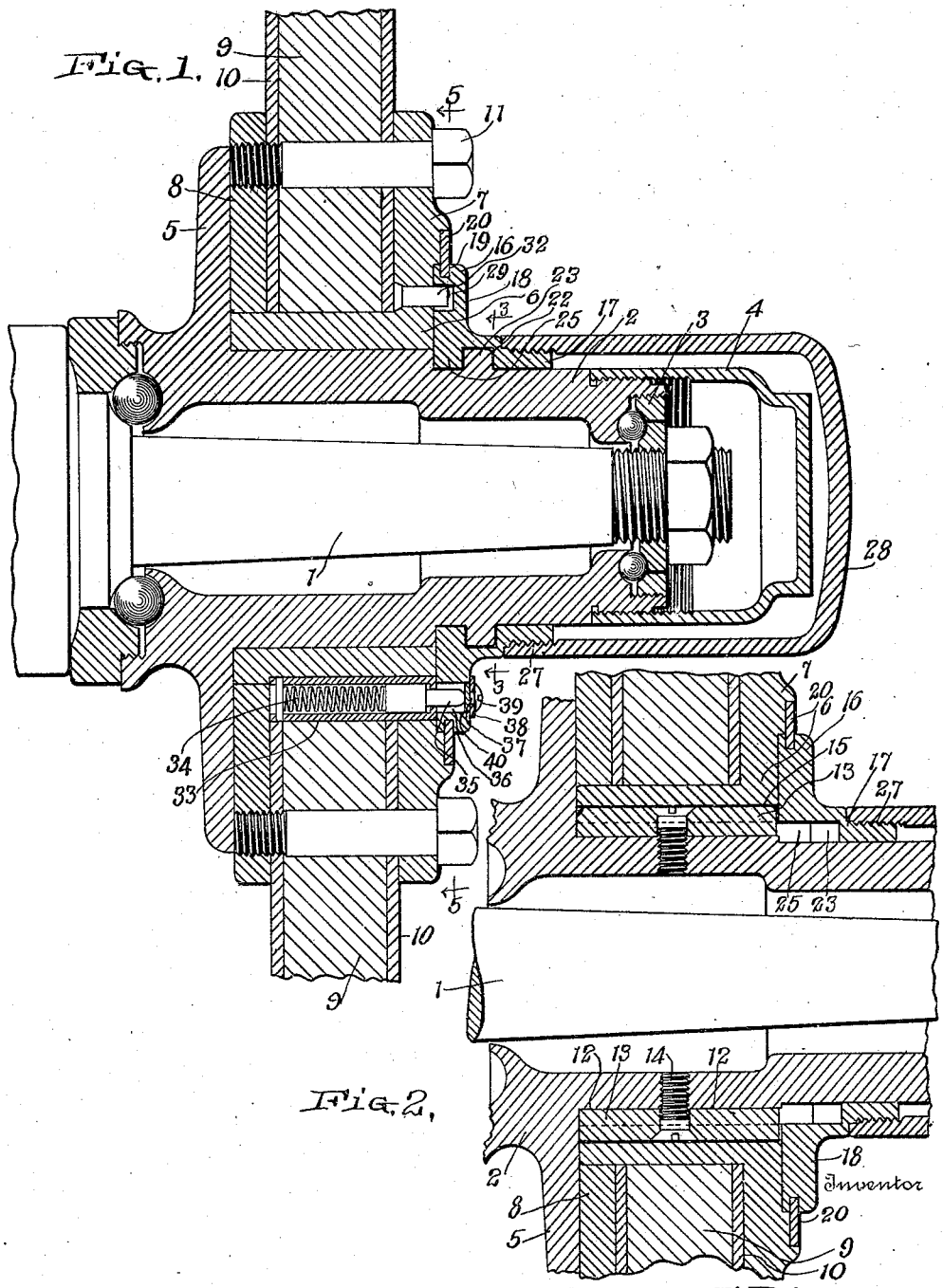
Charles T. Ridgely

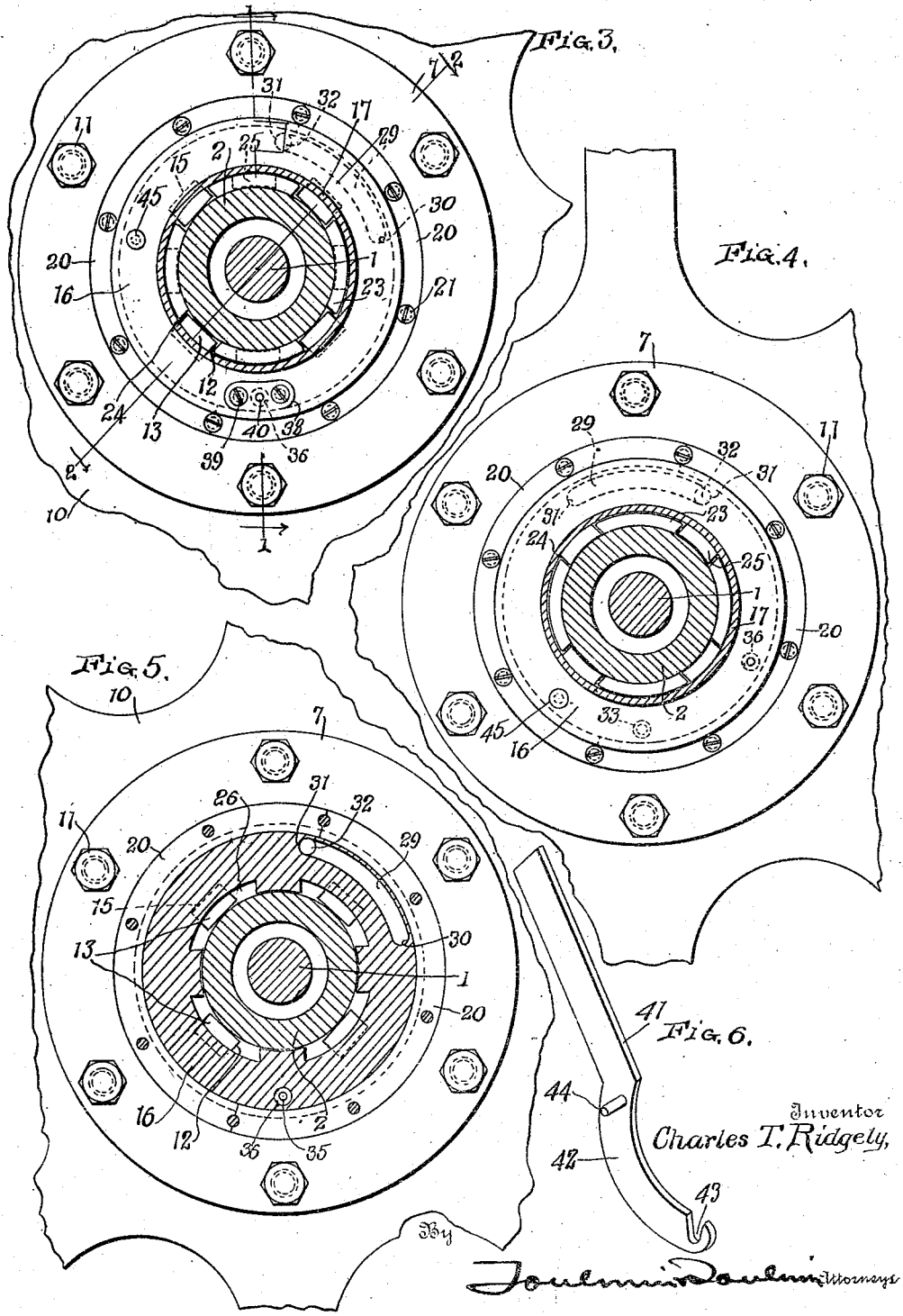

UNITED STATES PATENT OFFICE.

CHARLES T. RIDGELY, OF SPRINGFIELD, OHIO.

DEMOUNTABLE WHEEL FOR VEHICLES.

1,186,833.   Specification of Letters Patent.   Patented June 13, 1916.

Application filed December 27, 1915. Serial No. 68,658.

*To all whom it may concern:*

Be it known that I, CHARLES T. RIDGELY, a citizen of the United States, residing at Springfield, in the county of Clark and State of Ohio, have invented certain new and useful Improvements in Demountable Wheels for Vehicles, of which the following is a specification, reference being had therein to the accompanying drawing.

This invention relates to demountable wheels for automobiles and vehicles in general. The present invention is in the nature of an improvement upon the devices shown and described in my co-pending applications, Ser. Nos. 3254 and 50,327, filed June 7, 1915, and Sept. 13, 1915, respectively.

The object of this invention is to provide an organization of parts whereby a wheel can be easily and quickly removed from the main hub and at the same time be securely held in place when mounted thereon. This organization of parts will be described more fully hereinafter.

In the accompanying drawings, Figure 1 is a sectional view on the line 1—1 of Fig. 3, the parts being shown in locked position; Fig. 2 is a sectional view on the line 2—2 of Fig. 3; Fig. 3 is a sectional view on the line 3—3 of Fig. 1; Fig. 4 is a sectional view similar to Fig. 3 but showing the parts in unlocked position; Fig. 5 is a sectional view on the line 5—5 of Fig. 1; and Fig. 6 is a detail perspective of the operating lever.

In the embodiment of the invention here shown the usual axle 1 has mounted thereon a main hub 2. This main hub, as shown, has the inner portion thereof enlarged in order that the hereinafter described supplemental hub can be easily removed therefrom without interfering with the main hub. This arrangement has the further advantage of being able to properly locate the means for keying the supplemental hub upon the main hub. The hub 2 is provided with anti-friction bearings 3 and has screw-threaded upon its outer end a suitable grease cap 4. The hub 2 is provided near its inner end with a radial flange 5 against which the supplemental hub is adapted to lie. The supplemental hub, as indicated at 6, comprises a sleeve which encircles the raised portion of the hub 2 and at its outer end has a radial flange or face plate 7. An annular plate 8 is located upon the rear end of the sleeve portion of the supplemental hub 6. The spokes of the device here shown consist of a series of metal casings, as indicated at 10, having wood fillers, as indicated at 9. These spokes are adapted to be securely clamped between the flange 7 and the plate 8 by means of bolts 11. Any construction of spoke, however, may be used, but it will be seen that by this method of clamping the same to the supplemental hub a very rigid structure is insured. In order to key the supplemental hub to the main hub the main hub is provided at its raised portion with recesses 12 extending longitudinally of the hub and arranged circumferentially therearound in spaced apart relation. Within each of these recesses is an elongated bar of metal 13 which extends above the plane of the surface of said main hub. These bars are suitably fastened to the hub by means of screws 14. The supplemental hub has a corresponding series of slots 15 adapted to register with the projecting portions of the bars 13. It will be seen that by this arrangement the supplemental hub can be attached to the main hub by registering the slots therein with the metallic bars of the main hub and then sliding the same axially against the flange 5. This arrangement insures the rotation of the supplemental hub with the main hub and provides a rigid structure which is not easily damaged.

In order to lock the supplemental hub against axial movement relative to the main hub I have provided a locking member 16. This locking member comprises a sleeve 17 encircling the reduced portion of the hub 2 and having a radial flange 18 at its inner end. This radial flange extends vertically and lies closely adjacent to the supplemental hub 6 and its flange 7. In order to securely fasten the locking member to the supplemental hub I have provided the former with a recess 19 adapted to engage an annular plate 20 fastened to the flange 7 by means of series of screws 21. By this arrangement it will be seen that the locking member is held against axial movement relative to the supplemental hub and is also held against displacement relatively thereto, but is free to rotate around an axis coincident with the axis of the axle. The inner surface of the sleeve 17 is provided with a circumferential groove 22. Extending into this groove and located upon the reduced portion of the hub 2 is a series of elongated lugs 23. These lugs are arranged circumferentially around the hub 2 and at right angles to the axis thereof and are spaced apart, as clearly shown in the drawings, the spaces being indicated at 24. Projecting inwardly at the inner end of the locking member 16 is a series of circumferentially arranged lugs 25 located to the rear of the lugs 23 and parallel therewith. The lugs 25 are spaced apart, the spaces being indicated generally at 26 and are arranged to coöperate with the lugs upon the main hub 2, as will be described hereafter. The outer end of the sleeve of the locking member 16 is screw-threaded, as indicated at 27, and has screwed thereon a dust cap 28. In order to limit the amount of rotation of the said locking member 16 stops are provided. In the present embodiment of the invention the locking member is provided with a curved groove or recess, as shown at 29. The walls of the extremities of this recess constitute stops and are indicated by the numerals 30 and 31. Fixedly mounted upon the supplemental hub and extending into the said groove 29 is a lug 32. By this arrangement it will be seen that the rotation of the locking member is limited by the length of the groove, the lug 32 engaging either one end or the other of the said groove as the locking member is rotated.

In order to prevent the displacement of the locking member when the wheel is in use the supplemental hub is provided with a casing 33 in which is mounted a spring 34 which, when the parts are in locking position, presses a detent 35 into engagement with a hole 36 located in the locking member 16. It will be seen by this arrangement that before the locking member can be operated the detent must be pressed out of engagement with the hole 36. In front of the detent is located a plate 37 which acts as a protector to prevent the accumulation of dust within the casing, thereby interfering with the operation of the detent. The plate 37 is loosely mounted within the slot 36 and can slide longitudinally thereof. Mounted at the front of the locking member is a retaining plate 38 fastened to the locking member by means of screws 39. This plate has an aperture 40 in alinement with the slot 36.

In Fig. 6 is shown a lever for the purpose of operating the device to mount and demount the wheel. This lever has a handle 41 and a curved portion 42. The outer end of the curved portion 42 has a recess, as shown at 43, and the inner end of the curved portion has a projecting lug, as shown at 44. In using this lever the lug 44 is placed through the aperture 40, thereby engaging the plate 37 and pushing the detent 35 out of the hole 36. The hook portion 43 is adapted to engage the lug 45, as shown in Fig. 3. When the lever is thus located an upward movement of the handle thereof will rotate the locking member 16 from locked to unlocked position.

As shown in Figs. 1 and 3, the device is in locked position. It will be seen that the lugs 25 of the locking member are located centrally and to the rear of the lugs 23. When in this position it is impossible to move the supplemental hub axially. It will also be noticed that in this position the lug 32 engages the end 31 of the groove 29. It is, therefore, apparent that when the member 16 is rotated from unlocked to locked position this stop will prevent the further rotation thereof after the same is locked. When it is desired to remount the wheel, the lever is attached to the locking member, as described above, and the same is rotated. This rotation can continue until the lug 32 engages with the end 30 of the groove. When in this position the wheel can be moved axially. The lugs 25 of the locking member will then be located in front of the spaces 24 between the lugs 23 of the hub 2. Thus, it will be seen that the supplemental hub can be moved axially without interference, the lugs 23 being in alinement with the spaces 26 between the lugs 25.

In the construction of the device the longitudinal bars 13 are located upon the main hub 2 to the rear and between each two successive lugs 23. By this arrangement when the lugs 25 are in line with the spaces 24 and the lugs 23 are in line with the spaces 26, the supplemental hub can then be easily moved axially to demount the same.

It will be seen that I have provided a device which is simple in all of its parts, rigid and easily operated. The action is positive and the parts so coöperate as to limit the movement of the locking member at the proper position either to lock or unlock the same. Movable parts have been eliminated as far as possible and the structure of the elements is such that they can be manufactured at a low cost.

While I have shown and described one embodiment of my invention it will be understood that this has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In a wheel, a main hub, a supplemental hub removably mounted on said main hub, means to lock said hubs together against axial movement, said means comprising a rotatable collar attached to the front of the supplemental hub, means comprising a spring-pressed detent on said supplemental hub, and a hole in said collar to lock the collar to the supplemental hub, and stops to limit the rotation of the collar so that the detent can aline with said hole.

2. In a wheel, a main hub comprising a cylindrical portion and a shoulder, a supplemental hub removably mounted on said cylindrical portion and comprising a face plate, and a locking mechanism adapted to engage said shoulder to lock the hubs together and comprising a collar rotatably mounted on said supplemental hub in engagement with said face plate.

3. In a wheel, a main hub provided with a cylindrical, enlarged portion and a reduced portion, said reduced portion being provided with a series of circumferentially arranged spaced apart lugs thereon spaced from said enlarged portion, a supplemental hub removably mounted on said main hub, and a rotatable locking member mounted on the front of said supplemental hub, said rotatable locking member being provided with a series of lugs similarly arranged, and projecting between said first-mentioned lugs and said enlarged portion, said supplemental hub being completely seated on said enlarged portion when said last-mentioned lugs so project and before the locking member can be rotated.

4. In a wheel, a main hub, a supplemental hub removably mounted on said main hub, one of said hubs having a series of circumferentially arranged lugs thereon, a locking member rotatably mounted upon the other of said hubs, said locking member having a series of circumferentially arranged lugs thereon, adapted to engage and disengage said first-mentioned lugs as the locking member is rotated, and means to limit the rotation of said locking member in both directions, whereby the rotation thereof is prevented after the lugs are in engaging position or after the lugs are in disengaged position.

5. In a wheel, a main hub, a supplemental hub removably mounted on said main hub, said hubs having longitudinally extending parts adapted to engage each other to key the hubs together, one of said hubs having a lug located in front and to one side of said longitudinally extending parts and the other of said hubs having a locking member movable into and out of engagement with said lug to lock and unlock the hubs.

6. In a wheel, a main hub provided with an inner flange and with a series of lugs spaced apart circumferentially thereof and arranged at right angles to the axis of the hub, a supplemental hub removably mounted on said main hub and provided with a rotatable locking member having a series of spaced apart lugs arranged at right angles to the axis of the hubs, the distance between said flange and the rear of the first-mentioned lugs being substantially equal to the distance between said flange and the front of the last-mentioned lugs, whereby when the supplemental hub is fully seated a simple rotation of the locking member will lock the hubs together without further pressure in an axial direction.

7. In a wheel, a main hub provided with a cylindrical portion, a supplemental hub removably mounted on said cylindrical portion, one of said hubs having a series of circumferentially arranged lugs thereon, a locking member rotatably mounted upon the other of said hubs, said locking member having a series of circumferentially arranged lugs thereon adapted to engage and disengage the first-mentioned lugs as the locking member is rotated, means to limit the rotation of said locking member in both directions, whereby the rotation thereof is prevented after the lugs are in engaging position or after the lugs are in disengaging position, and means for automatically locking said locking member in one of said positions.

8. In a wheel, a main hub, a supplemental hub removably mounted on said main hub, said main hub having a grease cap attached thereto, a locking member rotatably mounted on said supplemental hub to lock the same to said main hub, said locking member having a dust cap removably attached thereto inclosing said first-mentioned cap.

9. In a wheel, a main hub, a supplemental hub removably mounted thereon, means to lock said hubs together against axial movement, and means to prevent the displacement of said locking means, said last-mentioned means comprising a hole extending through said locking means, a spring-held detent extending into said hole, a dust plate located at the front end of said hole, and an apertured retaining means, whereby suitable tools may be inserted through said aperture against said dust plate to press the said detent out of engagement with said hole.

10. In a wheel, a main hub, a supplemental hub removably mounted thereon, means for locking said supplemental hub to said main hub, said locking means being located upon one of said hubs, the adjacent faces of said last-mentioned hub and locking means having a co-acting groove and lug to limit the movement of said locking means in both directions.

11. In a wheel, a main hub, a supplemental hub removably mounted on said main hub, said main hub having a series of spaced apart circumferential projections thereon, said projections being located at the outer end of said main hub, a keying device extending longitudinally of said main hub and located to the rear and between said projections, said supplemental hub having longitudinally extending portions adapted to coöperate in the said longitudinally extending keying device, a locking member rotatably mounted upon said supplemental hub, said locking member having a series of circumferentially spaced projections thereon, whereby said projections can be alined with each other to lock the hubs together or can be moved out of line with each other to unlock the hubs, and means on said supplemental hub and coöperating with parts of said locking member to limit the rotation thereof in both directions.

In testimony whereof, I affix my signature.

CHARLES T. RIDGELY.